United States Patent [19]

Ray et al.

[11] Patent Number: 5,673,376
[45] Date of Patent: Sep. 30, 1997

[54] METHOD AND APPARATUS FOR GRAPHICALLY GENERATING IMAGES OF ARBITRARY SIZE

[75] Inventors: Lawrence A. Ray; Richard N. Ellson, both of Rochester; David J. Kroth, N. Chili, all of N.Y.

[73] Assignee: Eastman Kodak Company, Rochester, N.Y.

[21] Appl. No.: 885,706

[22] Filed: May 19, 1992

[51] Int. Cl.$^6$ ................................................. G06T 15/10
[52] U.S. Cl. ................................................. 395/127; 395/128
[58] Field of Search .............................. 395/128, 129, 395/135, 127; 350/130; 355/44; 358/474, 494

[56] References Cited

U.S. PATENT DOCUMENTS

| | | | |
|---|---|---|---|
| 4,570,233 | 2/1986 | Yan et al. | 395/126 |
| 4,692,880 | 9/1987 | Merz et al. | 395/130 |
| 4,808,984 | 2/1989 | Trueblood et al. | 340/723 |
| 4,808,988 | 2/1989 | Burke et al. | 340/744 |
| 4,843,380 | 6/1989 | Oakley et al. | 340/723 |
| 4,851,825 | 7/1989 | Naiman | 340/728 |
| 4,862,388 | 8/1989 | Bunker | 395/127 |
| 4,878,183 | 10/1989 | Ewart | 395/128 |
| 4,879,605 | 11/1989 | Warkentin et al. | 358/296 |
| 4,908,780 | 3/1990 | Priem et al. | 395/135 |
| 4,927,238 | 5/1990 | Green et al. | 350/130 |
| 4,962,464 | 10/1990 | Henzi et al. | 395/103 |
| 5,113,213 | 5/1992 | Sandor et al. | 355/22 |

OTHER PUBLICATIONS

"Roots and Branches of 3-D" by Jim Clark, *BYTE*, May 1992.
"Photo-Realism" by Evan Yares, *BYTE*, May 1992.
"Radiosity" by John Wallace and John Fujii, *BYTE*, May 1992.
"3-D Displays" by David F. McCallister, *BYTE*, May 1992.
"Voxels: Data in 3-D" by Vincent Argiro and William Van Zandt, *BYTE*, May 1992.

*Primary Examiner*—Mark K. Zimmerman
*Attorney, Agent, or Firm*—Gordon M. Stewart

[57] ABSTRACT

A system and method that generates computer graphic images using anti-aliasing rendering to create sets of offset images each of a lower resolution than the resolution desired. The anti-aliasing rendering is performed using offset weights that effectively cause a graphic model to be rendered at different rendering points for each low resolution image which are offset between low resolution images. The lower resolution offset images are then interlaced or combined to produce the desired high resolution image.

12 Claims, 7 Drawing Sheets

| 52 P$_{00}$ | P$_{01}$ | P$_{02}$ | P$_{03}$ | P$_{04}$ | P$_{0n}$ |
|---|---|---|---|---|---|
| P$_{10}$ | P$_{11}$ | P$_{12}$ | P$_{13}$ | | |
| P$_{20}$ | P$_{21}$ | P$_{22}$ | P$_{23}$ | | |
| P$_{30}$ | P$_{31}$ | P$_{32}$ | P$_{33}$ | | |
| P$_{40}$ | | | | | |
| P$_{m0}$ | | | | | |

METHOD AND APPARATUS FOR GRAPHICALLY GENERATING IMAGES OF ARBITRARY SIZE

CROSS REFERENCES TO RELATED APPLICATION

This application is related to U.S. Application entitled Method And Apparatus For Creating Geometric Depth Images Using Computer Graphics having U.S. Ser. No. 07/884,001 and Kodak Docket No. 64,664 and incorporated by reference herein.

BACKGROUND OF THE INVENTION

1. Field of the Invention

The present invention is directed to graphic system generated hard-copy images and, more particularly, to a method and apparatus for generating such images at any desired resolution with a computer graphics system where resulting images can be used to create a perception of depth of the rendered scene typically found in a lenticular image.

2. Description of the Related Art

Computer graphics is a well-known and commercially viable means of creating imagery. Computer graphics generated images are most often displayed on computer monitors with a limited resolution, hence, there is little need to render images with a resolution greater than that of a conventional monitor resolution, approximately 1000×1000 pixels. There are occasions where there exists a need to render images with a higher resolution.

In addition, there exists an interest in using multiple view or viewpoint images to produce a single image to be viewed through a lenticular material 2 (FIG. 6) to give the perception of an image having depth. To be of acceptable quality, the depth image needs to be comprised of many view images 4, e.g., in the range of 8 to 24. The underlying principle is that the lenticular material acts like a lens, and each eye 6 is presented a view of the scene from a different vantage point. That is, a different one of the view images which was used to create the depth image is projected to different eye vantage points. These view images can come from many sources, though recently it has been proposed that one source of these images can be computer graphics as described in the related application previously mentioned. For the lenticular images to be acceptable the resolution of the digital printer has to be sufficiently high to print at least one line of pixels from each view under a single lenticule. Typical lenticular material has 53 lenticules/inch, With a moderate number of views per lenticule, say 12, the resolution must be at least 636 dots/inch. If the normal resolution from a computer graphic system is used to create such prints or transparencies, then the lenticular images can only be approximately 1.5 inches square.

This limitation significantly reduces the utility of computer graphics as a source for lenticular images, because larger format images are more useful. A useful size being on the order of 8 inches per side. With a 1000 dot/inch printer, this results in the preference for a computer graphics system capable of producing images with the resolution of 8000 pixels. This is well beyond the rendering capabilities of most computer graphics systems.

There are several ways to augment a conventional computer graphics system to produce a system which supplies larger format images, yet many of these approaches fail to produce images of high quality since they either sample the model at a smaller format or introduce artifacts. For example, the large image format, say 2N×2N pixels, could come from a four-fold replication of each pixel in a N×N pixel image. This approach is the equivalent of a magnification of each pixel and leads to blockiness in images. A more sophisticated approach would be to use hi-linear interpolation to make a 2N×2N pixel image from a N×N. This does not have the blocking effect, but it does suffer from a loss of sharpness since the hi-linear interpolation blurs edges. Neither of these methods samples the model (generates pixels based on the model) at a resolution greater than or equal to the resolution of the desired final image. Approaches to generating the image at the final print resolution despite graphics system limitations involve breaking the image into sections which are small enough to be handled by the graphics system and then splicing the sections together. One method of rendering the image in sections translates the eye position and fixes the eye direction. Most computer graphics systems will produce unacceptable blocking artifacts in this case due to a lack of a capability for handling the discontinuities in perspective between the image segments. What is needed is a system that will generate high resolution large format graphic images using graphics systems without artifacts and perspective discontinuities in which the image generation is based on a sampling of the model (pixel generation) at a resolution equal to or greater than the final image printing resolution.

SUMMARY OF THE INVENTION

It is an object of the present invention to allow a graphic system of limited rendering resolution to produce an image of arbitrarily high resolution.

It is another object of the present invention to provide a method whereby an image processing system of limited image size processing capability can be used for images of arbitrary size.

It is an additional object of the present invention to maintain model detail in large format graphic images.

It is also an object of the present invention to provide the ability to produce large format images using graphics systems.

It is a further object of the present invention to generate graphics images where the images are anti-aliased.

It is still a further object of the present invention to generate graphics images suitable for three-dimensional imaging where the three dimensional images can be anti-aliased.

The above objects can be attained by a system that generates graphic images using super-sampling to create sets of offset images each of a lower resolution than the resolution desired. Super-sampling can be accomplished by performing offset anti-aliasing rendering using weights to create the images offset by one or more pixels. The lower resolution images are then interlaced or combined to produce the desired high resolution image.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is applicable not only to graphic rendering systems which produce images, but to image acquisition systems that have limited image size acquisition capability and are capable of producing offset images. The present invention is concerned with solving the problem of generating high resolution images from conventional imaging systems by the combination of multiple offset sampling (pixel generation) passes of conventional image supplying means. In the preferred embodiment, the image supplying means is an image generator such as a computer graphics rendering system which supplies pixel values based on a geometric model of objects, physical properties and the lighting environment. Other embodiments could have the image supplied by image scanners such as the Kodak 35mm Rapid Film Scanner or the MacAngelo II document scanner by Marstek or any detector which creates an image whose size is limited by hardware of software constraints yet can be controlled in a manner which will allow many images from multiple offset passes of the detector to be combined into a final image of equal or higher resolution.

The present invention, as will be discussed in more detail hereinafter, takes advantage of anti-aliasing capabilities of conventional graphics packages to create offset low resolution images which are combined to provide a high resolution large format image suitable for depth images as well as suitable for enlarging to produce a large format print, such as a poster or billboard.

The present invention, as will be discussed in more detail hereinafter, takes advantage of multiple sampling or super-sampling in the neighborhood of a desired offset image point using a predetermined sampling pattern to improve image quality of the final image. In the preferred embodiment using computer graphics rendering as the supplier of pixel data, this procedure is known as anti-aliasing. It uses image data sampled at resolutions even higher than the desired final resolution and combines these images to produce the desired final resolution image. This provides a final high resolution large format image suitable for depth images as well as suitable for enlarging to produce large a format print, such as poster or billboard.

Figure 1A:
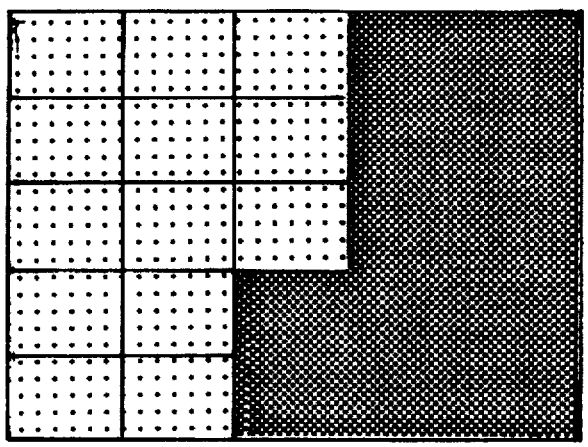
FIGS. 1(a) and 1(b) illustrate anti-aliasing used to reduce edge jump artifact in image offset.

One common artifact that occurs in many computer generated images is the stair-stepping of lines and edges as illustrated in FIG. 1(a). This is referred to commonly as "jaggies" which results from the fact that the images are digitally constructed with the pixels being arranged on a regular rectangular lattice (see Andrew Glassner, Ray Tracing, Academic Press, 1989.) There are conventional methods to reduce the jaggies such as sampling the image many times at different locations within a pixel and taking a weighted average of the results which is sometimes called anti-aliasing. The present invention modifies the conventional anti-aliasing rendering technique for the purpose of constructing an arbitrary resolution graphics system from a conventional graphics system with the addition of a controlling means to manipulate the manner in which the conventional anti-aliasing technique is applied. The term rendering is applied to the process of producing a pixel value to associate with a point in the image. To determine the value to store to represent a pixel, the rendering program picks a representative location within the pixel at which it makes the value calculation. For non-anti-aliased rendering, the point is at the center of the pixel and the value becomes the value associated with the pixel. For anti-aliased graphics, there may be more than one point which is "rendered" (chosen for pixel value computations) and these points may be scattered about within the confines of the pixel. The values associated with the points are then combined to form the value associated with the pixel. A conventional system can store any single high resolution pixel which it renders. The problem is that it cannot render the points and store them in a single pass. Conventionally, there are either hardware or software limitations preventing the number of pixels in a dimension from exceeding a certain value. To clarify how supersampling is used in the present invention, both uses will be explained in detail. One is a non-conventional use to force the anti-aliasing routine to sample at a specified offset position within a pixel. The other use is also non-conventional and places a group of samples to be taken clustered about the offset position. It is unconventional for its offset position not being constrained to be the center of the pixel. The offset position is determined by the desired resolution and aspect ratios of pixels and number of interleaved images.

Figure 1B:
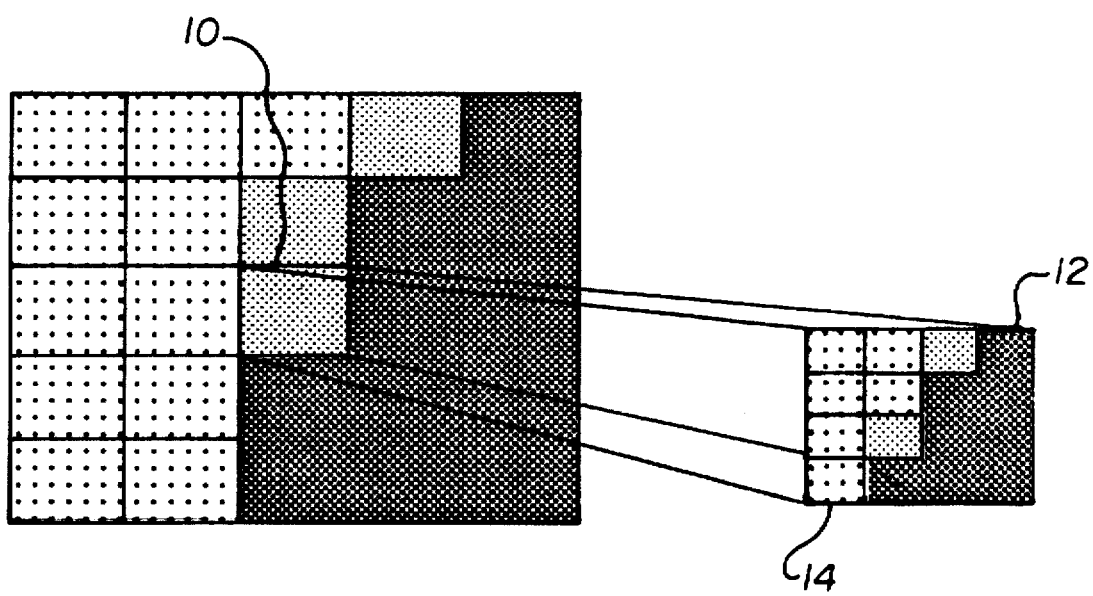
Figure 2A:
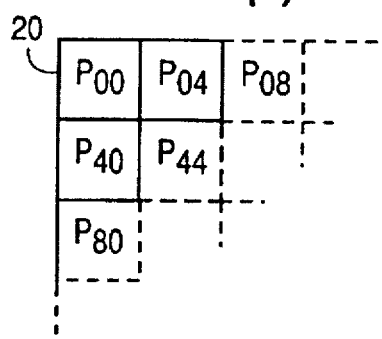
FIGS. 2(a) and 2(g) illustrate the offset principles of the present invention.
Figure 2B:
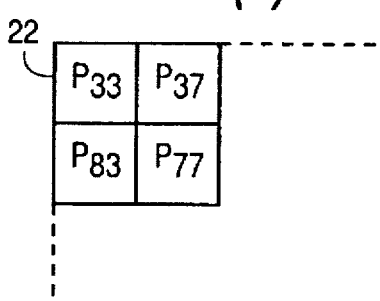
Figure 2C:
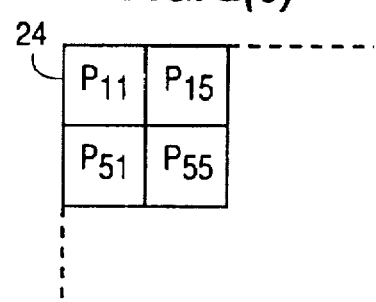
Figure 2D:
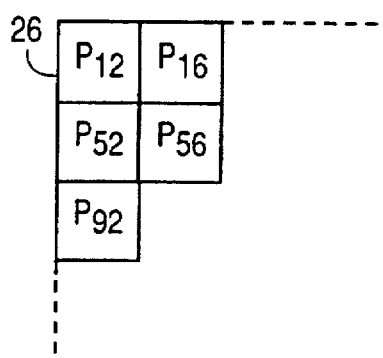
Figure 2E:
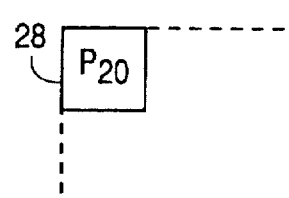
Figure 2F:
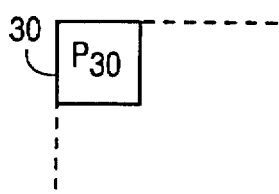
Figure 2G:
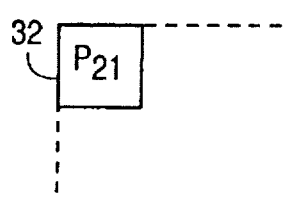
Figure 2H:
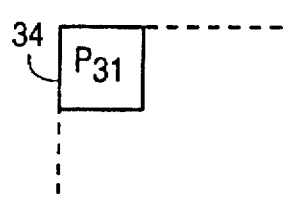
Figure 2I:
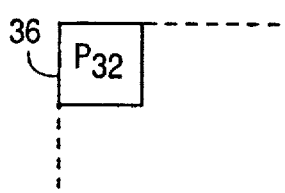
Figure 2J:
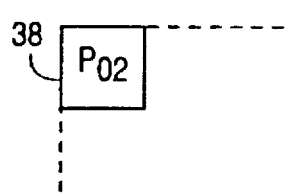
Figure 2K:
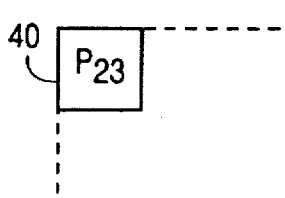
Figure 2Q:
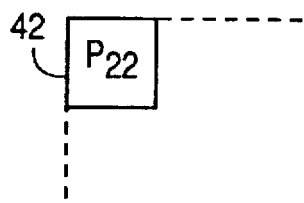
Figure 2Q:
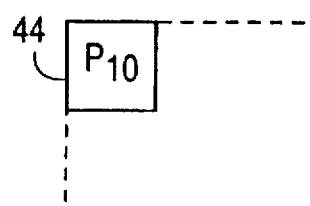
Figure 2Q:
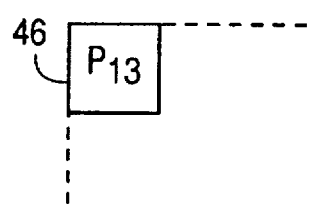
Figure 2Q:
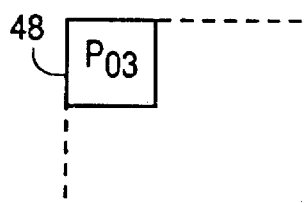
Figure 2Q:
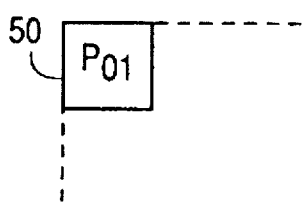

For understanding the conventional operation of anti-aliasing consider a single pixel 10 and a partition of that pixel 10 into a grid 12 of subpixels, as shown in FIG. 1(b). If each subpixel 14 is individually rendered and the subpixels of the grid 12 are averaged to form the larger pixel 10, then the edge transition appears less harsh since the pixel has a shade different from the adjacent pixels and is more appealing to the visual system. However, this increases the computational requirements of a rendering system as it effectively computes an image with higher resolution than will be rendered finally and the resolution is reduced by use of an average (or weighted average) of the calculated pixel. For convenience of understanding the weighing of the super-sampling of the anti-aliasing procedure can be represented or characterized by a matrix of weights. In FIG. 1 the weighing matrix used is a 4×4 matrix although other size matrices can be used. The matrix of weights is given as:

$$A = \begin{vmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{vmatrix} \qquad (1)$$

and the matrix can be applied to the super-resolved pixel using:

$$\text{pixel}(i,j) = \sum_{l=1}^{4} \sum_{m=1}^{4} a_{l,m} \text{subpixel}(i,j;l,m) \qquad (2)$$

where pixel is the high resolution image, subpixel is the low resolution image and $a_{l,m}$ is the weight of the matrix. A weighing based anti-aliasing system can be found in graphics systems such as RAYlib available for the AT&T Pixel Machine from AT&T and MODELER from Wavefront for the Silicon Graphics computers. Strictly speaking, these systems do not constrain the distribution of points to be an array. The offset location of a point is described by a pair of values in the range 0 to 1 where (0.5, 0.5) would be the coordinates of the center of the pixel. Each point has an associated weight. In normal rendering the value of a pixel is determined by rendering at the center point 0.5, 0.5 and using a weight of 1. For anti-aliasing rendering more than one point is rendered where all the coordinates are within the 0 to 1 range. The values calculated for the points are then combined through a weighted average. The weights must sum to 1.

The principles of the offset generation of multiple low resolution images and the combining or interleaving of the low resolution images to produce the desired high resolution image is shown in FIG. 2. Assume that the desired image is 8,000 by 8,000 pixels and the conventional graphics arts writers graphics system can produce images with a conventional anti-aliasing procedure that have a maximum resolution of 2000 pixels by 2000 pixels. In this situation the conventional graphics system is required to produce 16 offset images where each offset image is offset with respect to the other images by from one to three pixels. The present invention selects different pixel rendering points within the model for each of the images, where the pixel rendering points for the effect images are offset with respect to each other. The weights used in the anti-aliasing process effectively select the point rendered. FIGS. 2(a)–2(g) show sections of 16 such offset images 20–50, generated by effectively using different rendering points within the model, which are then used to produce the high resolution image 52. In particular the interleaving of the images 20–50 to produce image 52 is illustrated by images 20–26 and 52. Each generated image, for example image 20, provides every fourth pixel in the interleaved image 52. The subscripts of the pixels in the generated low resolution images 20–50 indicate their final position in the interleaved high resolution image 52. The combined or interleaved image can then be used for further processing such as in creating a hard copy of the particular image or creating a lenticular depth image print.

Figure 3:
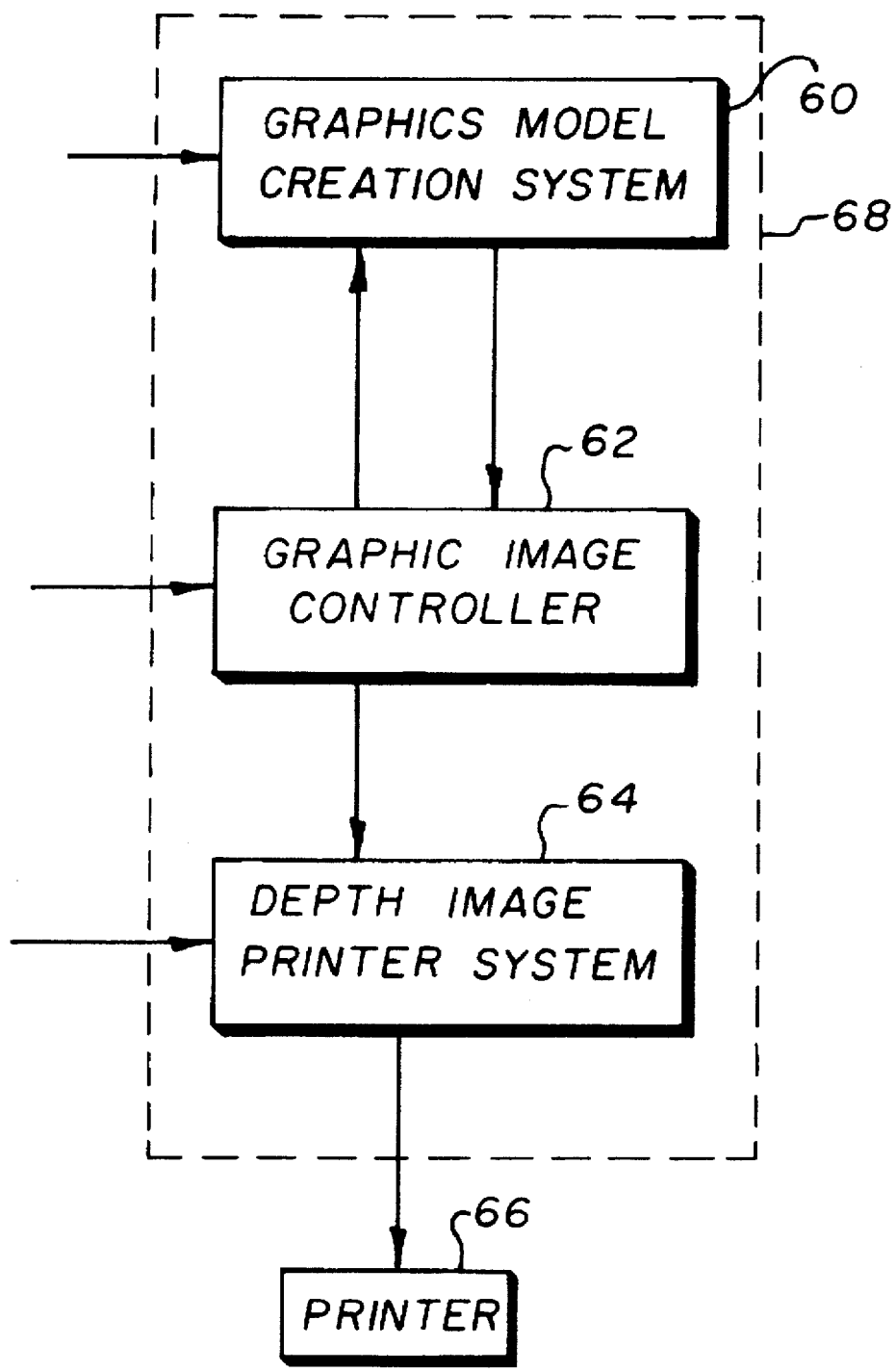
FIG. 3 depicts the components of system in which the present invention can be used.

The present invention is preferably used in a depth image system 58 as illustrated in FIG. 3 and described in more detail in the related graphics application previously discussed. Of course those of skill in the art will recognize that the present invention can be used in other systems such as in producing high-resolution images using conventional graphics arts writers and the high resolution images produced can be used to create billboards or posters.

In a depth image system 58, a graphics model creation system 60 is used to create a geometric or graphic model of an object, such as a building, which will be reproduced as a lenticular depth image. The system 60 preferably corresponds to the RAYlib system previously mentioned. The graphics model creation system 60 is driven and controlled by a graphic image controller 62 which causes views of the object, such as a building, to be stored. The stored views are processed by a depth image printer system 64 and used to control a printer 66 to produce the lenticular depth image. As discussed in the related application, the systems 60–64 can be implemented in a computer system 68 such as the AT&T Pixel Machine combined with a SUN workstation. The present invention is preferably part of the graphic image conversion system 62 although, as will be discussed later herein, portions of the geometric model creation system 60 are used by the present invention.

Figure 4:
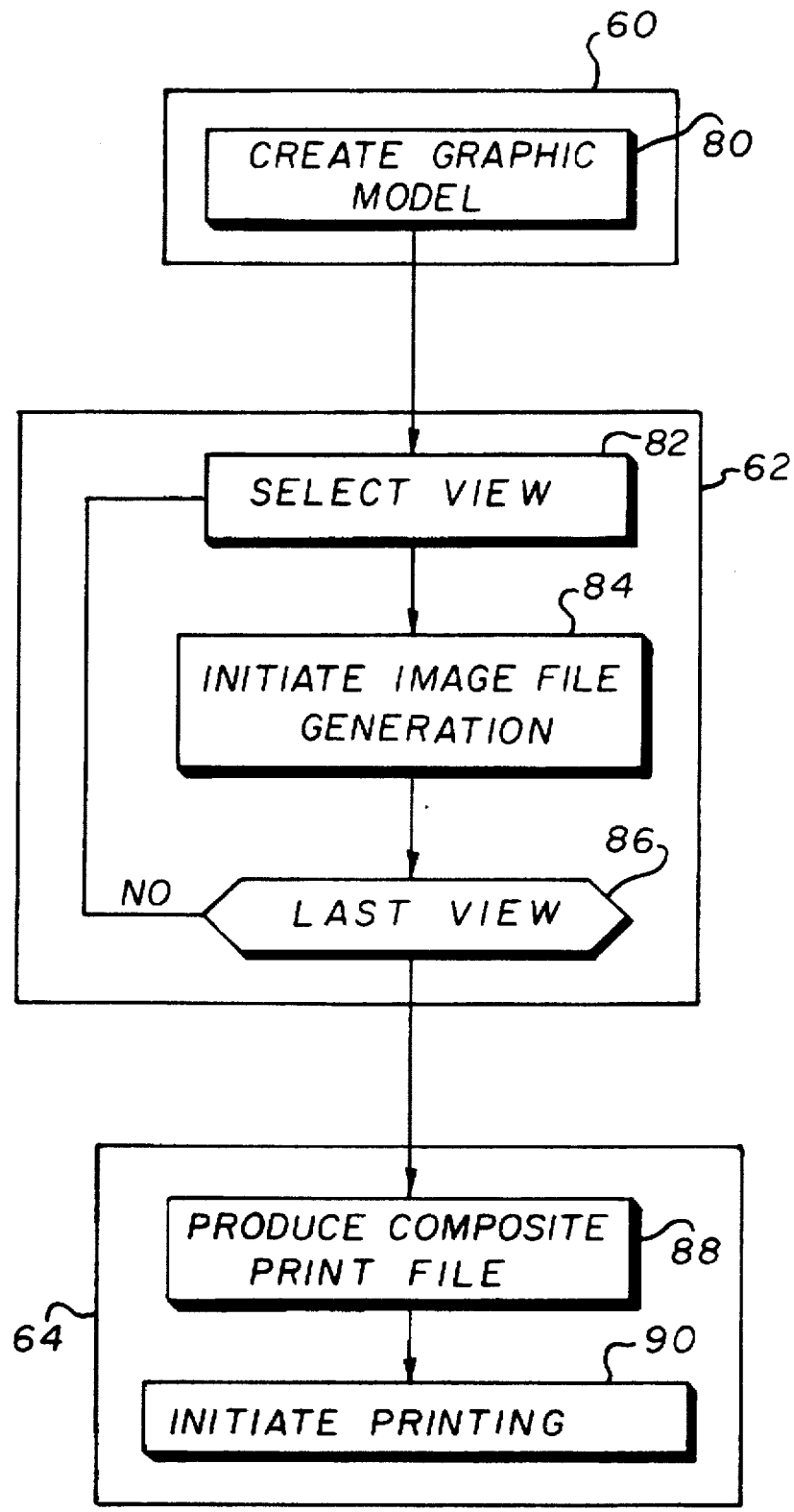
FIG. 4 is a flow diagram of a process for creating a depth image.

FIG. 4 illustrates in greater detail the steps performed in the system illustrated in FIG. 3. First, a user creates 80 a graphic model which will be rendered into a depth image, such as a lenticular print. The graphic image controller 62, in accordance with a selection criteria, selects 82 a view to be rendered and then initiates 84 image file generation by the system 62. The anti-aliasing rendering is performed by essentially calling a subroutine in the preferred RAYlib system previously discussed with a list of the points to be rendered and the associated weights. Once the offset image is generated the point and weight list is changed to produce a different offset image and rendering is again initiated. When all of the offset images are generated for the particular view, the offset images are interleaved to create the desired high resolution view image. Of course the interleaving can be performed as each pixel is generated or after each offset image is completed to reduce the image storage requirements. When the last view 86 has been generated, a composite file is produced 88. Once the composite file is produced, the printing operation is initiated 90.

Prior to performing the image file generation operation the size of the aliasing matrix or offset matrix or list of points and weights is determined. This determination can be performed prior to system execution or during the process of FIG. 4 as the first step of the generation operation 84. The first step is determining the size of the matrix or list is to determine the resolution of the desired high resolution image. In the current example, the desired high resolution image size is 8,000 pixels by 8,000 pixels. The maximum resolution of the subpixel sampling or rendering process, such as the graphics system being used, is determined next. We will assume, consistent with the example discussed herein, that the graphics package will process or produce an image 2,000 pixels by 2,000 pixels. Once the desired resolution and maximum resolution is determined, the width of the desired image is divided by the maximum width of the maximum resolution of the rendering process to determine the number of desired pixable pixels for each resolvable pixel. In the current example 8,000/2000=4. The result is rounded up to next highest integer, if the result is not an integer, to obtain an offset matrix indicia "L" which is the number "M" of subpixels required per pixel in the width direction. The procedure is repeated for the height parameter to determine the number of subpixels required for a pixel in the height direction. The offset or anti-aliasing matrix is an LXM matrix and in the current example this is a 4×4 matrix as set forth in equation 1. The weights in this matrix or list are then set so that only one subpixel in the subpixel sampling has a weight of one and all other weights are zero. Weight values other than one could be used, however, they are not particularly needed in the offset sampling of the present invention. In the 8,000 to 2,000 pixel example, a set of matrices M1–M16 as illustrated in the offset matrix table below are created.

| OFFSET MATRIX TABLE | | | |
| --- | --- | --- | --- |
| M1 | M2 | M3 | M4 |
| 1000 | 0100 | 0010 | 0001 |
| 0000 | 0000 | 0000 | 0000 |
| 0000 | 0000 | 0000 | 0000 |
| 0000 | 0000 | 0000 | 0000 |
| M5 | M6 | M7 | M8 |
| 0000 | 0000 | 0000 | 0000 |
| 1000 | 0100 | 0010 | 0001 |
| 0000 | 0000 | 0000 | 0000 |
| 0000 | 0000 | 0000 | 0000 |
| M9 | M10 | M11 | M12 |
| 0000 | 0000 | 0000 | 0000 |
| 0000 | 0000 | 0000 | 0000 |
| 1000 | 0100 | 0010 | 0001 |

-continued

OFFSET MATRIX TABLE

| 0000 | 0000 | 0000 | 0000 |
|------|------|------|------|
| M13  | M14  | M15  | M16  |
| 0000 | 0000 | 0000 | 0000 |
| 0000 | 0000 | 0000 | 0000 |
| 0000 | 0000 | 0000 | 0000 |
| 1000 | 0100 | 0010 | 0001 |

These matrices can be created and stored prior to the rendering processing or created during rendering process once the user has entered the width and height of the desired high resolution image and of the maximum resolution of the image processing system. Or an appropriate list of points and weights can be created. The preferred RAYlib system allows the user to enter the coordinates of the points and the weight associated with each point in a list. Each entry in the list contains an xy coordinate where x and y are usually on the scale 0 to 1 and correspond to the boundaries of the pixel and a weight w also from 0 to 1 which corresponds to the relative importance of the points contribution to the final pixel value. The points are listed as triples (x,y,w). In the example above, for the RAYlib system, the list would look like:

| L1 | L2 | L3 |
|----|----|----|
| (.125, .875, 1.) | (.375, .875, 1.) | (.6251 .875, 1.) |
| L4 | L5 | L6 |
| (.875, .875, 1.) | (.125, .625, 1.) | (.375, .625, 1.) |
| L7 | L8 | L9 |
| (.625, .625, 1.) | (.875, 625, 1.) | (.125, .375, 1.) |
| L10 | L11 | L12 |
| (.375, .375, 1.) | (.625, .375, 1.) | (.875, .375, 1.) |
| L13 | L14 | L15 |
| (.125, 125, 1.) | (.375, .125, 1.) | (.625, .125, 1.) |
| L16 | | |
| (.875, .125, 1.) | | |

It should be understood that there are a variety of methods for describing the sampling, pixel generation or rendering of points to be used in the model space within a subpixel. For anti-aliasing on a 2×2 grid of points within a subpixel for L13, the list would be: L13 (0.0625, 0.0625, 0.25), (0.1875, 0.0625, 0.25), (0.0625, 0.1875, 0.25), (0.1875, 0.1875, 0.25). Furthermore, the decision for sampling these points can be even more complicated. Suppose in the case of L13 with 4 points described above that after 3 points were sampled and all returned the same value, then the next point could be skipped. Another algorithm might add a small random shift to the xy coordinates of the points. These applications of the weighing and sampling should be understood to be within the scope of the present invention as well as other techniques commonly know to practitioners of computer graphics. Such techniques range from a completely defined grid points and weights to random point locations and even to adaptive convergence methods where the number of sampled points is, for example, determined by the magnitude of change in the moving average of the computed pixel value.

Figure 5:
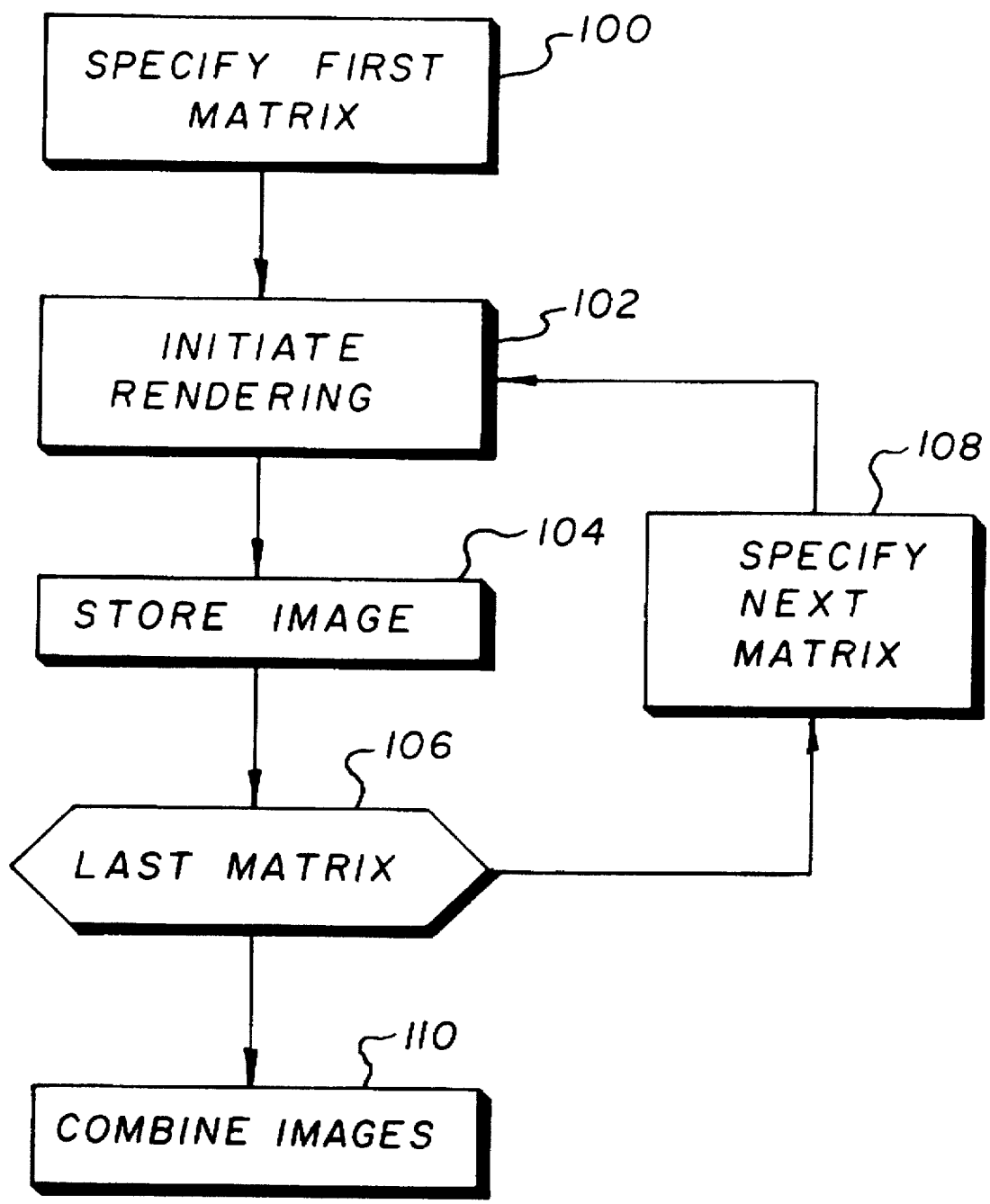
FIG. 5 is a flow diagram of a process for rendering images using offset aliasing.
Figure 6:
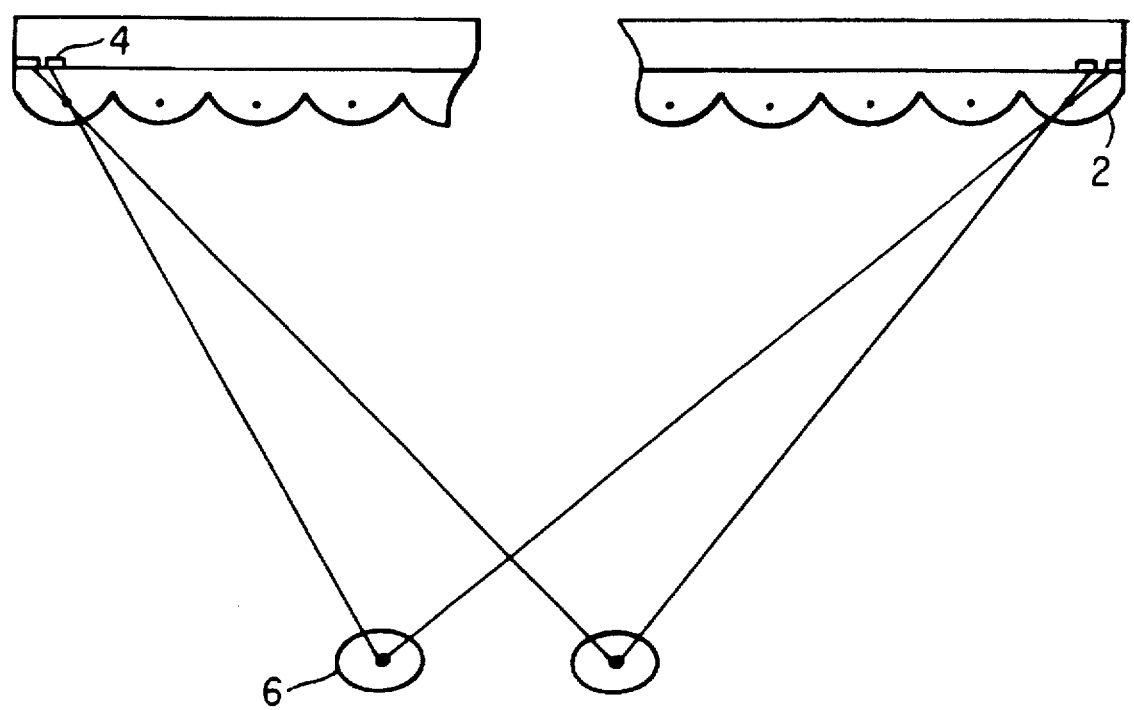
FIG. 6 illustrates a lenticular depth image.

Once the matrices or the lists have been specified (created or retrieved) for each offset image to be produced, in the current example 16 matrices or lists are specified, the high resolution image file is created in accordance with the process illustrated in FIG. 5. First, the first matrix or list entry is specified 100, for example, matrix M1 or list entry L1. If previously created the first matrix or list entry is retrieved from storage and loaded into the anti-aliasing subroutine weight of the graphics image processing software. If not previously created a user of ordinary skill in the art can create an appropriate matrix or list. The system then initiates 102 anti-aliasing rendering using the specified matrix or list entry, producing an image at the maximum resolution of the process which is stored in an intermediate image file (not shown). The single weight of one in the matrix or list produces an offset image. When matrix M1 or list entry L1 is used the image corresponds to the offset image 20 of FIG. 2. The system then determines 106 whether all the matrices have been processed. If not, the next matrix or list entry is specified 108, for example matrix M2 or list entry L2, and used to render a corresponding image. This loop, in which different anti-aliasing matrices or list entries are used to produce and store images, continues until all have been processed 106. In the present example, 16 images would be rendered and stored in the intermediate image file. Once the intermediate image file is complete, the system interlaces or combines 110 the image files into a single high resolution image.

Combining or interlacing involves taking the L×M images and reconstructing the complete high resolution image. The interlacing process must select pixels from the intermediate offset images in order with or corresponding to their spatial position. This order is given by:

$$HR_{(i,j)} = LR_{(i \bmod l, \, j \bmod m)}(i/l, j/m) \tag{3}$$

where HR(i,j) is the (i,j)th pixel of the combined high resolution image, and LR(l,m) is the image pixel which results from anti-aliasing at Subpixel(i,j;l,m). Moreover, the division is integer division which truncates any fractional parts. This results in a high-resolution data file in a sequence which can be displayed. Once the combined image has been produced, it can be used, as previously discussed, as one of the images in a lenticular depth image.

Because the high resolution image itself is a digital image, it is possible for the edge artifacts, as illustrated in FIG. 1 to exist within the high resolution image produced using the present invention. That is, aliasing can occur. To prevent aliasing from occurring in the high resolution image, supersampling can be performed at a finer level or higher resolution where or while each pixel in the high resolution image is created using a conventional anti-aliasing matrix. If it is desired to further improve the sharpness of a high resolution image, anti-aliasing can be applied to each of the subpixels of the low resolution images in accordance with the following anti-aliasing weighing matrix.

$$A = \begin{vmatrix} B_{11} & B_{12} \\ B_{21} & B_{22} \end{vmatrix} \tag{4}$$

where all but one submatrix $B_{i,j}$ is the zero matrix and the non-zero matrix is the normal anti-aliasing matrix of weights. The anti-aliasing can be extended to even larger sampling matrices where the sampling matrix is weighted to affect the anti-aliasing of the subpixels. Even though this will increase processing time, it will reduce artifacts that occur at edges of the high resolution depth image.

The present invention satisfies the need to generate arbitrarily high resolution images using a graphics system. The invention combines a special use of the anti-aliasing function common to conventional computer graphics rendering software and a method of interlacing or combining the images to produce a high resolution image. The anti-aliasing function or operation provides all the pixels necessary to construct an image with higher resolution than the conventional computer graphics software produces during normal use. The low resolution images which are combined into the high resolution image are produced by constraining the conventional computer graphics software to sampling at a single subpixel region and repeating the rendering at another subpixel region. The subpixel regions are determined by the size of the desired image and the maximum resolution of the rendering software. The pixel data produced in this way results in low resolution images offset with respect to each other. These images are combined or interlaced to produce the final high resolution image. By using the constrained rendering the offset images all have the same perspective and other computer graphics environment variables, thereby eliminating the artifacts and perspective shifts which occur in the prior art.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of rendering a graphic image model at a first resolution higher than a second resolution of an image produced by a graphics process capable of rendering at the second resolution, comprising the steps of:

(a) offset rendering, from a viewpoint, the graphic image model at the second resolution for each second resolution image using different pixel offset rendering points to produce second resolution images each having the viewpoint;

(b) interlacing the second resolution images producing a combined graphic image at the first resolution and with the viewpoint; and (c) displaying the combined graphic image at the first resolution.

2. A method as recited in claim 1, wherein step (a) performs:

$$\text{pixel}(i,j) = \sum_{l=1}^{4} \sum_{m=1}^{4} a_{l,m} \text{subpixel}(i,j;l,m)$$

where pixel is the first resolution image, $a_{l,m}$ is an offset matrix corresponding to one of the offsets, n is a constant and subpixel is one of the second resolution images.

3. A method as recited in claim 2, wherein step (b) performs:

$$HR(i,j) = LR_{(l \bmod l, j \bmod m)}(i/l, j/m)$$

where HR is the combined image and LR is one of the second resolution images.

4. A method as recited in claim 1, further comprising the step of (c) using the combined graphic image to make a lenticular image by combining the combined graphic image having the viewpoint with other images having different viewpoints.

5. A method as recited in claim 1, further comprising the step of (c) enlarging the combined graphic image.

6. A method as recited in claim 1, wherein step (a) includes:

(i) a first step of performing anti-aliasing on the graphic image model to produce subpixels; and (ii) a second step of anti-aliasing the subpixels produced in the first step using different rendering points.

7. A method as recited in claim 6, wherein step (a) performs $$\text{pixel}(i,j) = \sum_{l=1}^{n} \sum_{m=1}^{n} a_{l,m} \text{subpixel}(i,j;l,m)$$

where pixel is the first resolution image, $a_{l,m}$ is an offset matrix corresponding to one of the offsets, n is a constant and subpixel is one of the second resolution images.

8. A method of producing an image with a first resolution higher than a second subpixel resolution of an imaging rendering process, comprising the steps of:

(a) rendering, from a viewpoint, the image at the second subpixel resolution at subpixel offsets corresponding to a ratio of the first and second resolutions producing second resolution images having the viewpoint;

(b) combining the produced second resolution images into a combined graphics image at the first resolution and having the viewpoint; and (c) displaying the combined graphics image at the first resolution.

9. A method as recited in claim 7, wherein step (b) performs $$HR(i,j) = LR_{(l \bmod l, j \bmod n)}(i/l, j/m)$$

where HR is the combined image and LR is one of the processed images.

10. An apparatus for rendering a graphic image with a first resolution and a viewpoint, comprising:

a rendering device having a maximum rendering resolution of a second resolution lower than the first resolution and rendering offset images at the second resolution having an offset with respect to each other and having the viewpoint;

a combining device combining the offset images into the graphic image having the viewpoint; and a display for displaying the graphic image.

11. An apparatus as recited in claim 10, wherein said rendering means includes anti-aliasing means for producing the offset images using offset anti-aliasing matrices.

12. An image of a first resolution, comprising:

a first image of a graphic object of a first resolution rendered at a second resolution lower than the first resolution and having a first pixel rendering point and having a viewpoint; and a second image of the graphic object rendered at the second resolution and having the viewpoint, the second image being combined with the first image at an offset specified by a second pixel rendering point offset with respect to the first pixel rendering point to produce the image of the first resolution having the viewpoint.

* * * * *

UNITED STATES PATENT AND TRADEMARK OFFICE
CERTIFICATE OF CORRECTION

PATENT NO. : 5,673,376
DATED : September 30, 1997
INVENTOR(S) : Lawrence A. Ray, Richard N. Ellson, David J. Kroth It is certified that error appears in the above-identified patent and that said Letters Patent is hereby corrected as shown below:

```
Column 9, line 45, delete the two numerals "4" in the
equation and insert a lowercase --n-- in each of the two
occurrences.

Column 10, line 29, delete "in claim 7" and insert
--in claim 8--.
```

Signed and Sealed this

Third Day of March, 1998

Attest:

BRUCE LEHMAN

Attesting Officer

Commissioner of Patents and Trademarks